United States Patent
Wang et al.

(10) Patent No.: US 10,660,118 B2
(45) Date of Patent: May 19, 2020

(54) LOGICAL CHANNEL PRIORITY RECONFIGURATION FOR MAC-CES IN NR

(71) Applicant: Telefonaktiebolaget LM Ericsson (publ), Stockholm (SE)

(72) Inventors: Min Wang, Luleå (SE); Jan Christoffersson, Luleå (SE); Mats Folke, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 41 days.

(21) Appl. No.: 16/066,651

(22) PCT Filed: Feb. 5, 2018

(86) PCT No.: PCT/EP2018/052780
§ 371 (c)(1),
(2) Date: Jun. 27, 2018

(87) PCT Pub. No.: WO2018/141952
PCT Pub. Date: Aug. 9, 2018

(65) Prior Publication Data
US 2019/0357235 A1    Nov. 21, 2019

Related U.S. Application Data

(60) Provisional application No. 62/454,697, filed on Feb. 3, 2017.

(51) Int. Cl.
*H04W 72/12* (2009.01)
(52) U.S. Cl.
CPC ... *H04W 72/1242* (2013.01); *H04W 72/1268* (2013.01)
(58) Field of Classification Search
CPC .................. H04W 72/1242; H04W 72/1268
See application file for complete search history.

(56) References Cited

U.S. PATENT DOCUMENTS

| 2011/0170495 | A1* | 7/2011 | Earnshaw | H04W 72/02 370/329 |
| 2015/0110048 | A1* | 4/2015 | Damnjanovic | H04W 72/048 370/329 |

(Continued)

FOREIGN PATENT DOCUMENTS

| WO | 2008069616 A2 | 6/2008 |
| WO | 2010135720 A1 | 11/2010 |

OTHER PUBLICATIONS

Interdigital "RLC Window Management and Receive Buffer Overflow"; 3GPP TSG RAN WG2 #61; Sorrento, Italy, Feb. 11-15, 2008; pp. 1-6; R2-081033.

*Primary Examiner* — Afshawn M Towfighi
(74) *Attorney, Agent, or Firm* — Coats & Bennett, PLLC (57) ABSTRACT

Methods and apparatus for improving the implementation or Logical Channel Prioritization (LCP) in advanced wireless communication networks are presented. For instance, in an example method (200) of the present disclosure, a network node (106) (e.g. base station, eNB, etc.) can determine to alter LCP order (10) utilized by a user equipment (UE) (102) to an altered LCP order (12) and can indicate the altered LCP (12) order to the UE (102). Furthermore, in an example method (210) performed by UE (102) in a wireless communication system (100), UE (102) can receive a message (116) indicating an altered LCP order (12) from a network node (106), and in response, can alter an LCP order (10) utilized by the UE (102) to the altered LCP order (12) indicated by the message (116). Further embodiments include corresponding apparatus, computer programs, and computer program products.

43 Claims, 6 Drawing Sheets

(56) References Cited

U.S. PATENT DOCUMENTS

2017/0302355 A1* 10/2017 Islam .................. H04B 7/0639
2019/0090229 A1* 3/2019 Iwai ..................... H04L 47/805

* cited by examiner

LOGICAL CHANNEL PRIORITY RECONFIGURATION FOR MAC-CES IN NR

CROSS-REFERENCE TO PRIORITY APPLICATION

The present application claims priority to U.S. Priority Patent Application No. 62/454,697, filed on Feb. 3, 2017, and entitled "Logical Channel Priority Reconfiguration for MAC-CES in NR," the entirety of which is incorporated herein by reference.

BACKGROUND

As mobile communication technology advances, greater communication speed, and therefore reduced latency, are necessary to reach Quality of Service (QoS) benchmarks for network subscriber services. One such advanced technology has been coined New Radio (NR). New Radio can be operated from below 1 GHz to around 100 GHz and the carrier bandwidth can be located within a relatively large range, for instance, 10 MHz to 1 GHz. During standards discussions, it has been agreed that Long Term Evolution (LTE) uplink (UL) scheduling will serve as the baseline standard for UL scheduling in NR.

One important aspect in UL scheduling is the logical channel prioritization (LCP), which determines the order in which a transport block (TB) is filled with data. In situations where a time-frequency resource grant is not large enough to accommodate all data to be transmitted, the priority of the different Media Access Control (MAC) control elements (CEs) and different logical channels (LCH) determines which data will be selected for earliest transmission.

In LTE, the logical channel priority configuration is static and prioritizes control signaling over data transmission. As data throughput requirements increase and data latency requirements decrease, however, prioritizing control signaling over data payload can have a detrimental effect on the latency and throughput of the system.

Therefore, improved techniques are needed for configuring priority between logical channels that allow, in certain instances, data transmissions to be prioritized over control signaling.

SUMMARY

For Release 14, which includes wireless communication standards that implement so-called Fifth Generation (5G, also referred to as New RAT or New Radio (NR)) protocols, the Third Generation Partnership Project (3GPP) is currently studying implementation options for various aspects of the eventual body of 5G standards. As planned in the study scope, NR will operate from below 1 GHz to around 100 GHz and the carrier bandwidth can vary within a large range (e.g., 10 MHz to 1 GHz) depending on the availability and definition of potential NR carriers.

NR aims to provide a broad variety of capabilities to be applied in an array of different usage scenarios envisioned for International Mobile Telecommunications (IMT) for 2020 and beyond, including enhanced Mobile BroadBand (eMBB), Massive Machine-Type Communications (mMTC), and/or Ultra-Reliable and Low Latency Communications (URLLC). In addition, NR aims to develop solutions to fulfill the requirements (e.g., in terms of latency, bit rates, etc) for the different usage scenarios. For instance, for URLLC, the target for user plane latency is 0.5 ms for the uplink (UL), and 0.5 ms for the downlink (DL). For eMBB, the target for such user plane latency is 4 ms for UL, and 4 ms for DL. Furthermore, if possible, the latency should also be low enough to support the use of the next-generation access technologies as a wireless transport technology, and can be used within the next-generation access architecture.

In addition, NR standards aim to utilize aspects of LCP that are presently utilized in LTE systems. LCP operations typically involve a MAC entity considering a relative priority amongst MAC control elements (CEs) and the logical channels (LCs) when assembling transmission blocks (TBs) for transmission after receiving a time-frequency resource grant from a network. For instance, in LTE, MAC entities considered the following MAC-CEs and LCs in decreasing order when performing LCP (see 3GPP TS 36.321, section 5.4.3.1):

1. MAC control element for a Cell Radio Network Temporary Identifier (C-RNTI) or data from the Uplink Common Control Channel (UL-CCCH);
2. MAC control element for Semi-Persistent Scheduling (SPS) confirmation;
3. MAC control element for Buffer Status Report (BSR), with exception of BSR included for padding;
4. MAC control element for Power Headroom Reporting (PHR), Extended PHR, or Dual Connectivity PHR;
5. MAC control element for Sidelink BSR (except Sidelink BSR for padding);
6. Data from any LC, except data from UL-CCCH;
7. MAC control element for BSR included for padding; and
8. MAC control element for Sidelink BSR included for padding.

The intention of the LCP in LTE is to ensure that important control signaling is always prioritized over data (i.e. application, over-the-top data, or user data), and also that data with different latency requirements (certain MAC-CEs or LCs) can be prioritized, with respect to other MAC-CEs or LCs. In the LTE framework, however, there is no possibility to prioritize data over control signaling.

The URLLC services introduced above have strict requirements in terms of latency. As shown above, most of MAC-CEs (except MAC-CE for padding BSR and padding Sidelink BSR) have higher priority than data from LCs. In some instances, a UE may have a small grant that is not sufficient to transmit both the data associated with MAC-CEs and URLLC data at one time (e.g., in the same transport block). In such situations, the UE would then be required to transmit the MAC-CEs first and transmit the URLLC data when a new grant is received. Consequently, the UE may fail to fulfil the latency requirement for URLLC.

In a scenario encountered in current implementations, a UE can have both URLLC data and eMBB (enhanced mobile broadband) data from two separate logical channels (LCs) marked for transmission to a network node (e.g., base station, eNB, gNB, etc.). When the UE receives an UL grant from the network node, a BSR for eMBB is generated and triggered for transmission. According to the current LTE LCP order described above (see 3GPP TS 36.321 section 5.4.3.1), the UE must first assign resources to BSR. After these resources are allocated to the BSR, if remaining unallocated time-frequency resources (e.g., resource elements, resource element groups, etc.) exist after the BSR grant, the UE then assigns these remaining unallocated resources to logical channels based on existing parameters (e.g. QoS class identifier (QCI)). In doing so, the URLLC will first be allocated resources due to its tighter latency requirements. If the grant is not sufficient to transmit all URLLC data in the transmission queue at that time, however, the remaining URLLC packets may be left to wait to be transmitted in a subsequent transport block, risking a failure of the system to satisfy the latency requirements should the next grant presumably utilized for transmission of the remaining URLLC data arrive too late.

In another example, a transmission queue of a UE may contain URLLC data and a Power Headroom Report (PHR) MAC-CE for transmission upon the reception of an UL time-frequency resource grant from a network node. If the grant is not large enough to transmit both the PHR MAC-CE and URLLC data, the URLLC will again in this case be required to wait 20 for the next transmission grant and, yet again, risks failing to meet the required latency requirements.

These examples indicate that the existing static relative priority order between MAC-CEs and the logical channels are not effective and may cause data with challenging latency requirements to fail to meet their corresponding requirements. As the performance and latency requirements of NR and similar advanced communication technologies are significantly more advanced relative to LTE, to guarantee these required levels of performance, data may need to be sometimes prioritized over control signaling. It is therefore necessary to enhance the LCP procedure to better handle for different use case scenarios. As such, the present disclosure presents methods, devices, and systems that allow for such data-first LCP orders by reconfiguration of relative priority between MAC-CEs and logical channels.

For instance, in an example method of the present disclosure, a network node (e.g. base station, eNB, etc.) can determine to alter a logical channel prioritization (LCP) order utilized by a user equipment (UE) to an altered LCP order and can indicate the altered LCP order to the UE. Furthermore, in an example method performed by a UE in a wireless communication system, the UE can receive a message indicating an altered LCP order from a network node, and in response, can alter an LCP order utilized by the UE to the altered LCP order indicated by the message. Further embodiments include corresponding apparatus, computer programs, and computer program products.

DETAILED DESCRIPTION

The present disclosure describes example techniques for setting and reconfiguring the relative priority between MAC-CEs and logical channels in a wireless communication system. In an aspect, the network controls the determination of the order of LCP, and thus one or more network nodes (e.g., eNBs, base stations, etc.) may perform the order and dynamically modify it based on present or expected network, UE, and/or communication channel conditions.

In some examples, the UE may have a default LCP state or "default priority list" for LCP that is based on that of LTE (see 3GPP TS 36.321 section 5.4.3.1). This default LCP order, like in LTE, is static and can be applicable to all UEs 102 of the system 100, for instance as a default, baseline, or initial state. In some examples, this default LCP order or state is always used if no updated LCP orders have been communicated to the UE or UEs 102 by a network node 106 (e.g., whether not having received an altered LCP order includes (a) never having received an altered LCP order or (b) not having received an altered LCP order for a particular period of time since receiving a most recent altered LCP list). Priority between logical channels and/or MAC-CEs in the default priority list or default LCP order may be determined based on existing parameters (e.g. QoS class identifier (QCI) of data transmitted or to be transmitted, network conditions, transmission medium/interface/channel conditions, observed UE conditions, etc.). In some examples, the network operator or manufacturer of the UE 102 and/or network node 106 can provide the default LCP order, which in other examples, the default LCP order is signaled by the network node 106. The network may signal another, altered LCP order when necessary, to override the default LCP order or portions thereof. In addition, this technique for implementing dynamic LCP ordering could be implemented on various granularities depending on the needs and/or use case, such that changes to LCP ordering can be operator-specific, cell-specific, or UE-specific. Therefore, certain example embodiments may include setting a default order of LCP to that of LTE (e.g., as described in 3GPP TS 36.321 section 5.4.3.1), and then dynamically altering the LCP order based on certain network-side, channel, and/or UE-side conditions, including, but not limited to, the conditions above.

Figure 1:
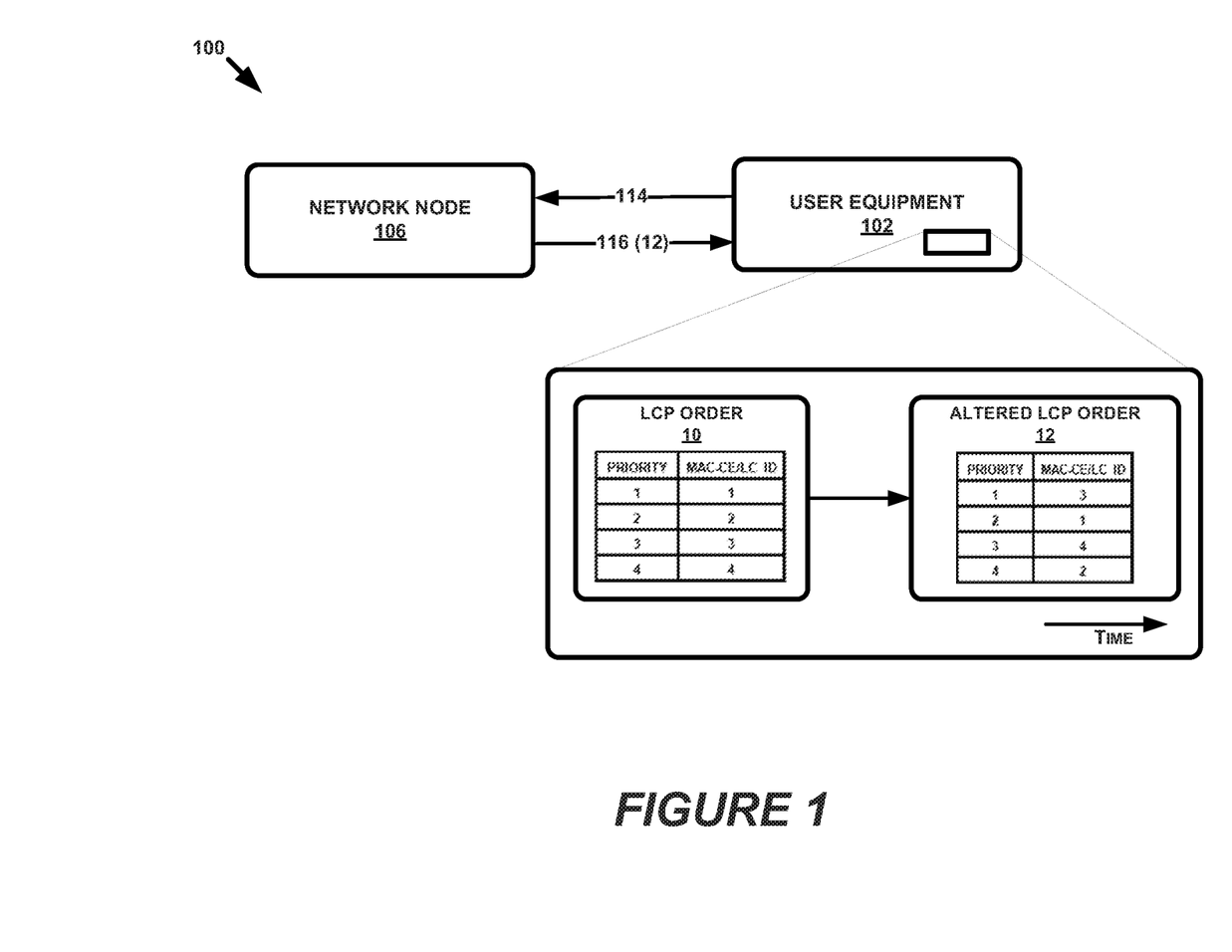
FIG. 1 illustrates a wireless communication system corresponding to example embodiments of the present invention.

FIG. 1 illustrates an example wireless communication system 100 that includes one or more UEs 102 in communication with one or more network nodes 106, which together may operate as an access network and/or core network. In some examples, network nodes 106 may operate collaboratively, as each network node 106 may utilize its own processing resources, memory, modules, etc. in conjunction with those of other network nodes 106 to perform aspects of the present disclosure. As such, the term "network node" can be substituted for the term "network nodes" as used herein.

The network nodes 106 are configured to determine an order for logical channel prioritization (LCP), which may be simply referred to as "the order" herein. In an aspect, the order can be dynamically alterable by the network node 106. In an example aspect, such LCP ordering may include prioritizing one or more data transmissions (such as those communicating user data, application data, and the like) over channel or control signaling, or vice versa. In an aspect, the UE 102 and the network node 106 may initiate LCP ordering according to a default LCP order that can be preconfigured, communicated over control signaling, or otherwise obtained by the UE 102 and/or the network node 106. In FIG. 1, this default LCP order can be represented by LCP order 10.

In a further aspect, based on observed value(s) of one or more network-side, channel, or UE 102 conditions obtained by the network node 106, it may determine to alter the presently-implemented LCP order 10. Again, this presently implemented LCP order 10 may be the default LCP order, though this is not an exclusive or necessary feature. In addition, the network node 106 can be configured to alter the LCP order 10 based on one or more observed (or predicted, estimated, etc.) conditions at the network, in a communication channel between the network node 106 and UE 102, and/or at the UE 102. Once such a determination is made, the network node 106 may generate, based on one or more configurations, rules, or algorithms, an altered LCP order 12 that will govern the LCP order of transmission blocks assembled and transmitted by the UE 102. To inform the UE 102 of the altered LCP 12, it can transmit the altered LCP order to one or more UEs 102 and thereafter can receive one or more communications from the UE 102 according to the altered LCP order.

In addition, UEs 102 are configured to generate data 103 and transmit that data 103 to the network node 106 according to an LCP order 10 (or subsequent to receiving it from the network node 106, the altered LCP order 12) received from the network node 106. The data 103 may include any type of data, including data that the particular UE 102 is configured to generate, transmit, and/or otherwise output and may be associated with any type of logical channel, including those communicating user data and/or application messages and those communicating control signals. In some examples, the UE 102 may be configured to transmit performance and/or characteristic data to the network node 106. The network node 106 may then use the data to determine values of certain conditions at the network node 106, at UE 102, over the air interface on one or more communication channels, and/or in the network as a whole. Based on these conditions, some of which can be reported by the UE 102 or measured by the network node 106, the network node 106 may determine to alter the LCP order 10 and signal a new order, the altered LCP order 12, that is to be subsequently utilized by the UE 102.

Figure 2A:
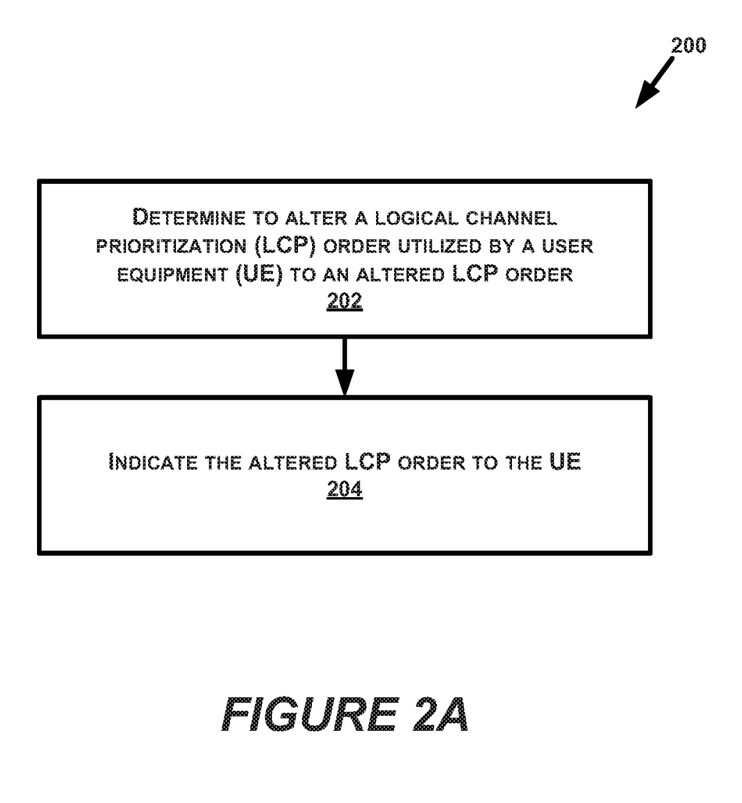
FIG. 2A illustrates a method performed by a network node according to one or more embodiments.

FIG. 2A illustrates an example method 200 performed by one or more network nodes 106 for controlling a dynamic LCP order for one or more UEs, where the one or more UEs 102 may use the LCP order, whether a default LCP order or an altered LCP order indicated by the network node, for subsequent uplink transmissions to the network node 106. For instance, at block 202, method 200 may include determining to alter an LCP order utilized by a UE 102 (e.g., a default LCP order that can be preconfigured or provided by the network node 106) to an altered LCP order. In addition, the example method 200 may further include indicating the altered LCP order to the UE, for example by transmitting the altered LCP order to the UE 102 in a downlink transmission.

In addition to the aspects of method 200 explicitly provided in FIG. 2A, method 200 may include one or more additional aspects that constitute a non-exclusive set of optional features that can be performed by network node 106 in addition to those described above in reference to blocks 202 and 204. For example, in some examples, indicating the altered LCP order to the UE 102 can include indicating channel priorities for each logical channel (LC) and/or medium access control control element (MAC-CE) available to the UE for uplink transmission. In such examples, the altered LCP order 12 transmitted to the UE 102 at block 204 includes each LC or MAC-CE usable by the UE 102 for transmission, and also includes a relative LCP corresponding to each LC or MAC-CE usable by the UE 102. In other examples, rather than explicitly indicating an LCP for every available and usable LC or MAC-CE, the network node 106 can transmit LCP values for only the LCs or MAC-CEs whose corresponding LCP changes relative to the LCP of the presently utilized LCP order (i.e., the LCP of the LCP order 10 directly preceding that of the altered LCP order 12). By indicating only the LCPs that have changed, the network node 106 can mitigate system overhead in most instances, since less information is typically necessary to indicate changes (or "deltas") between the presently implemented LCP order and that of the altered LCP order than is needed to indicate relative priorities for every available MAC-CE or LC.

In some examples, a priority level (e.g., indicated by an integer value) associated with each LC or MAC-CE) can be used to indicate the LCP for each available LC or MAC-CE. In other embodiments, such an integer value is replaced by simply indicating an ordered list of the available LCs and/or MAC-CE representing the altered LCP order to the UE. In other words, indicating the altered LCP order to the UE can involve transmitting relative priorities for two or more available logical channels via a logical channel list that contains the two or more available logical channels in a corresponding order of priority. Regardless of whether an ordered list or integer priority values are utilized, indicating the altered LCP involves the network node 106 transmitting relative priorities of two or more available logical channels or logical channel groups.

In a further optional aspect, indicating the altered LCP order to the UE 102 at block 204 can include transmitting dedicated Radio Resource Configuration (RRC) signaling indicating the altered LCP order to the UE. In some instances, this dedicated RRC signaling can be an RRC connection reconfiguration message. In some instances, the altered LCP order from the network node 106 can be targeted to a single UE 102, a group of UEs, or all UEs. Thus, in some examples, indicating the altered LCP order to the UE can include indicating the altered LCP order specifically to the UE via a MAC-CE. In other words, the network node 106 can control the LCP order of a single UE by sending a message intended particularly for a single UE 102, even where other UEs 102 are present in a cell. In other examples, the network node 106 can be configured to control an LCP order of any UE 102 in a cell by indicating an altered LCP order to the UEs via a System Information Block (SIB) message. By utilizing a SIB (or Master Information Block (MIB) or any other RRC system information message), the network node 106 can indicate the altered LCP order to all connected UEs 102 in the cell and/or all idle mode UEs 102 that are camping on the cell. In alternate embodiments, indicating the altered LCP order to the UE can include transmitting the altered LCP order via Layer 1 or Layer 2 signaling.

Furthermore, as indicated above, determining to alter the LCP order at block 202 can be responsive to a determination by the network node 106 that certain traffic fails to meet one or more Quality of Service (QoS) or latency requirements. Additionally or alternatively, determining to alter the LCP order can be responsive to a determination by the network node 106 that a system load meets a system load criterion for altering the LCP order. This criterion, in some cases may include a system load threshold whereby when the system load value at any given time meets the threshold value, an altered LCP order can be generated and indicated to one or more UEs 102. Likewise, in some instances, determining to alter the LCP order can be responsive to the network node 106 receiving an indication from the UE 102 that the UE 102 has an amount of data available for transmission that meets a data amount criterion for altering the LCP order.

Additionally, instead of being triggered by one or more parameter values, as outlined above, altering the LCP order can be responsive to the network node 106 receiving a request from the UE 102 to alter the LCP order. In other words, the UE 102 can, in some examples, generate a request to alter the LCP order (for instance, based on one or more triggering parameter conditions observed/measured by the UE 102) in order to ensure optimal performance.

In an aspect, the request message from the UE 102 can be received via RRC signaling. Although not a limiting aspect, the present disclosure proposes that one or more new information elements (IE) could be utilized in this capacity. In other words, certain embodiments may include improved RRC signaling schemes that may be used as a protocol for an LCP order. For instance, a new information element MAC-DynamicPrioConfig is proposed to specify the dynamic priority list for MAC-CEs and logical channels. This proposed IE includes priority indicators for each MAC-CE and logical channel (and/or related groups), respectively. An example of the structure of such an IE may be consistent with the pseudocode definition illustrated below (though it does not constitute a limiting example):

```
MAC-DynamicPrioConfig ::=        SEQUENCE {
    CRNTICE_or_ULCCCH_IND        INTEGER,
    SPSCE_IND                    INTEGER,
    BSRCE_IND                    INTEGER,
    PHRCE_IND                    INTEGER,
    SIDEBSRCE_IND                INTEGER,
    LCH1_IND                     INTEGER,
    LCH2_IND                     INTEGER,
    ...                          ...
    LCHN_IND                     INTEGER,
    PADDBSRCE_IND                INTEGER,
}
```

Of course, these values and structure are not limiting, as the detailed elements may change (e.g., depending on progress of 3GPP NR standardization on MAC-CEs). Also, the relative priority order between logical channels and MAC-CEs from this IE might be different compared to the priority determined based on QCIs or other factors or requirements of the implementing system 100. Thus, in some examples, such a request message can include one or both of a UEAssistanceInformation message that comprises information regarding a state of the conditions observed by the UE 102 and/or a MAC-DynamicPrioConfig Information Element (IE) that indicates a requested relative priority of each available MAC CE and logical channel.

In other examples, the request message can be received via Layer 1 or Layer 2 signaling. Furthermore, like the indication of the altered LCP order discussed above in relation to block 204 of FIG. 2A, the request message may contain a field indicating the requested relative priority of two or more available logical channels or logical channel groups by using an integer priority level requested for each available MAC-CE or LC, In some examples, the request message may indicate relative priorities for two or more available logical channels or MAC-CEs via an ordered list that contains the two or more available logical channels in a corresponding requested order of priority (accepting either or both of ascending or descending order is envisioned).

Figure 2B:
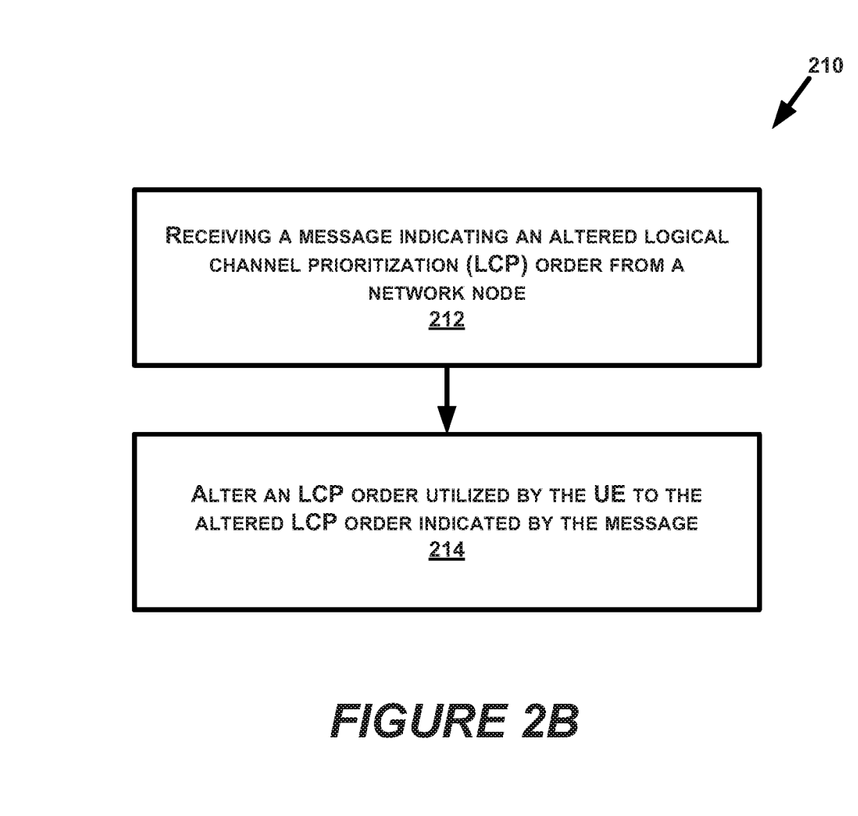
FIG. 2B illustrates a method performed by a UE according to one or more embodiments.

Turning to the operational features of the UE 102, FIG. 2B illustrates an example method 210 performed by one or more UEs 102 in a wireless communication system for performing uplink transmission using an LCP order. For instance, at block 212, method 210 may include receiving a message indicating an altered logical channel prioritization (LCP) order from a network node. In an aspect, at and immediately preceding the arrival time of the message received by the UE 102, the UE 102 could be using another LCP order different from the altered LCP order included in the message. In some instances, this other LCP order may be a default LCP order as discussed above, or may be an LCP order resulting from a previously received altered LCP order. In addition, method 210 includes, at block 214, altering the LCP order utilized by the UE to the altered LCP order indicated by the message.

In addition to the aspects of method 210 explicitly provided in FIG. 2B, method 210 may include one or more additional aspects that constitute a non-exclusive set of optional features that can be performed by UE 102 in addition to those described above in reference to blocks 212 and 214. For instance, in some instances, the message received from the network node can indicate one or more differences between the LCP order and the altered LCP order, thereby only including any LCP changes necessary to arrive at the altered LCP order from a currently implemented LCP order. In other examples, the message indicates relative channel priorities for each LC and/or MAC-CE available to the UE for uplink transmission. In some instances, the message may be included in RRC signaling, such as, but not limited to, an RRC connection reconfiguration message.

Furthermore, in some instances, as discussed above in reference to the network node 106 operation of method 200, the message can be addressed to the UE 102 specifically (alone/exclusively, or along with other UEs 102 of a group/non-exclusively) and can be received at the UE 102 via a MAC-CE. In other examples, the altered LCP order can be communicated to all connected UEs 102 in a cell and all idle UEs 102 camping on the cell (managed by network node 106) via a SIB message. In other examples, the altered LCP order is received at the UE via Layer 1 or Layer 2 signaling.

In a further aspect of the present disclosure, the UE 102 is configured to generate requests to alter an LCP order (such as the LCP order presently in effect at the UE 102), and may (or may not) request a particular altered LCP order as a replacement LCP order. The UE 102, therefore, can be configured to determine that one or more trigger conditions for generating such an LCP order request are present or achieved. For instance, in one example, the UE can be configured to determine that it has an amount of data available for transmission that meets a data amount criterion (e.g., reaches a threshold value) for altering the LCP order, and based on the determination, can generate a request message for altering the LCP order. In some examples, there may exist additional criteria that must be met before generation of a request message, such as that the data amount criterion must not only be reached, but reached continuously for a particular threshold time duration or reached a threshold number of times over this or a separate time duration.

In some instances, the request message (also referred to optionally as a request for prioritization) to the network node 106 resulting from the trigger may include an indication of the triggering condition. In other words, in some examples, the request message transmitted by the UE 102 to the network node 106 can indicate that the UE 102 has reached a threshold for the amount of data available for transmission. Alternatively or additionally, the request message can simply include requested alterations to the LCP order or a list of available LCs or MAC-CEs with associated relative priorities (indicated by an integer or by an ordered list, as discussed above.

Figure 3:
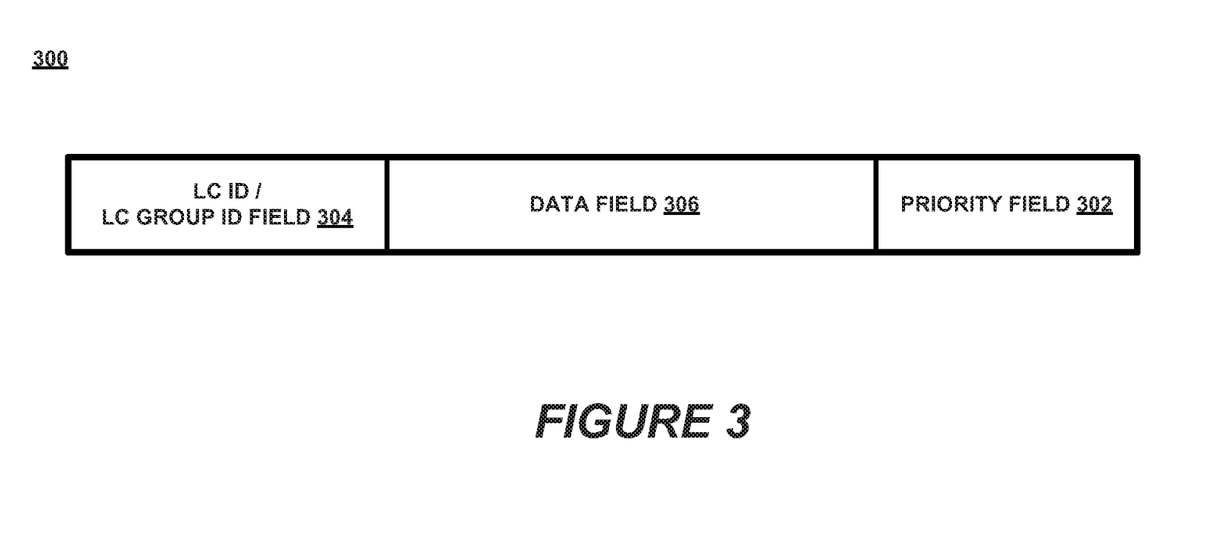
FIG. 3 illustrates a data structure utilized in example embodiments of the present disclosure.

Furthermore, FIG. 3 illustrates a new data structure 300 for indicating relative priority envisioned by the present disclosure, which can be used in relation to any of the example techniques described herein. As shown in FIG. 3, the data structure 300 can include a priority field 302 for indicating a priority (including an altered LCP) for each MAC-CE or LC, thereby indicating relative priorities of MAC-CEs and LCs that constitute an altered LCP order when viewed in the aggregate. Though not limiting, the example of such a data structure 300 shown in in FIG. 3 can be applied, for instance, for a short Buffer Status Report (BSR) MAC-CE. As shown, the example data structure 300 can include the added priority indicator 302, and an LC Identifier (ID) or LC Group ID field 304 identifying the subject LC or MAC-CE, as well as a truncated BSR MAC-CE data field 306 that is altered to accommodate the newly added priority indicator. Such a technique of truncating a portion of an existing data structure (e.g. 4G BSR MAC-CE for the non-limiting example data structure 300 of FIG. 3) in order to fit the new priority indicator can also be applied to other existing data structures that are currently in use.

In addition, unlike existing LCP techniques utilized by 4G systems, the techniques described herein can result in prioritizing one or more data transmissions over channel signaling in the altered LCP order. By utilizing this aspect and/or the other aspects above, the system can more thoroughly balance the competing goals of providing robust data service that meets QoS benchmarks for particular data/data classes and ensuring that critical control signaling is received properly (even if not as quickly as theoretically possible in a scenario where the UE always prioritizes control signaling as the highest relative priority for inclusion into transport blocks being prepared for transmission from the UE 102). Again, like in the aspects introduced in relation to FIG. 2A, the LCP order of block 212 can be a default priority list utilized by UEs absent any altered LCP order being indicated by the network node 102. In addition, the altered LCP order may be cell-specific in some instances, where it is UE-specific in others.

With the above methods 200 and 210 in mind, let us turn to FIGS. 4A, 4B, 5A, and 5B, which present example aspects of a UE 102 and network node 106, respectively, that are configured to carry out the techniques and methods presented above.

Figure 4A:
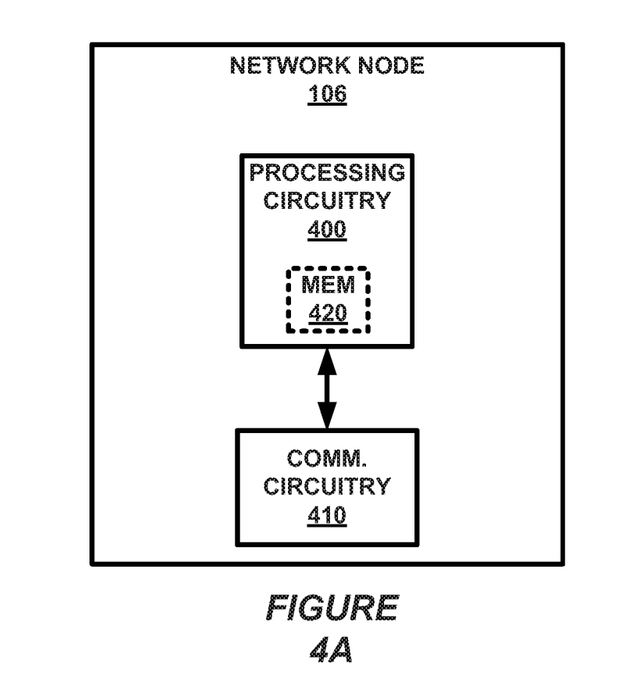
FIGS. 4A and 4B illustrate aspects of an example network node in example embodiments of the present invention.
Figure 4B:
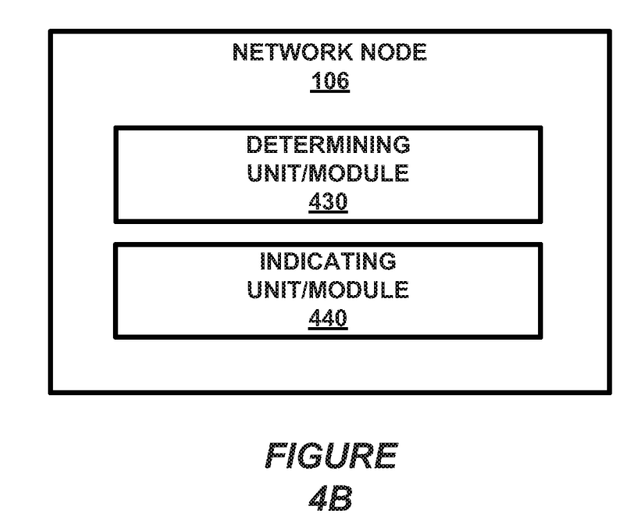

FIG. 4A illustrates additional details of an example network node 106 of a wireless communication system 100 according to one or more embodiments. The network node 106 is configured, e.g., via functional means or units (which also may be referred to as modules or components herein), to implement processing to perform certain aspects described above in reference to at least the aspects of FIGS. 1 and 2. As shown in FIG. 4B, the network node 106 in some embodiments for example includes means, modules, components, or units 430 and 440 (among other possible means, modules, components, or units not shown explicitly in FIG. 4B) for performing aspects of these techniques. In some examples, these means, modules, components, or units can be realized in processing circuitry 400. Specifically, the functional means or units of the network node 106 may include a determining unit/module 430 configured to determine to alter an LCP order utilized by a UE 102 to an altered LCP order, such as in block 202 of FIG. 2A. In addition, the network node 106 can include an indicating unit/module 440 configured to indicate the altered LCP order to the UE 102, for example, as performed in block 204 of FIG. 2A, above.

In at least some embodiments, the network node 106 comprises processing circuitry 400, which may include one or more processing circuits, configured to implement techniques described in reference to method 200 presented in FIG. 2A and certain associated processing of the features described in relation to FIG. 2A and/or other figures, such as by implementing functional means or units above (or those not explicitly shown). In one embodiment, for example, the processing circuit(s) 400 implements functional means or units as respective circuits. The circuits in this regard may comprise circuits dedicated to performing certain functional processing and/or one or more microprocessors in conjunction with memory 420. In embodiments that employ memory 420, which may comprise one or several types of memory such as read-only memory (ROM), random-access memory, cache memory, flash memory devices, optical storage devices, etc., the memory 420 stores program code that, when executed by the one or more microprocessors, carries out the techniques described herein.

In one or more embodiments, the network node 106 also comprises communication circuitry 410. The communication circuitry 410 includes various components (e.g., antennas) for sending and receiving data and control signals. More particularly, the circuitry 410 includes a transmitter that is configured to use known signal processing techniques, typically according to one or more standards, and is configured to condition a signal for transmission (e.g., over the air via one or more antennas). Similarly, the communication circuitry 410 includes a receiver that is configured to convert signals received (e.g., via the antenna(s)) into digital samples for processing by the one or more processing circuits. In some examples, this communication circuitry 410 may include indicating unit/module 440.

Figure 5A:
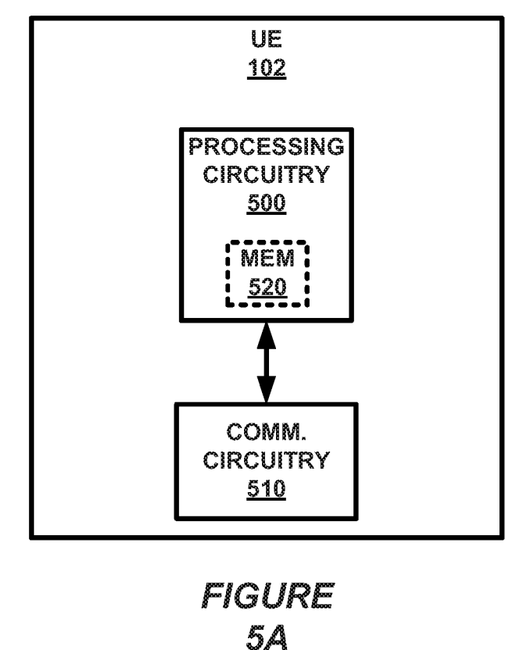
FIGS. 5A and 5B illustrate aspects of an example UE in example embodiments of the present invention.
Figure 5B:
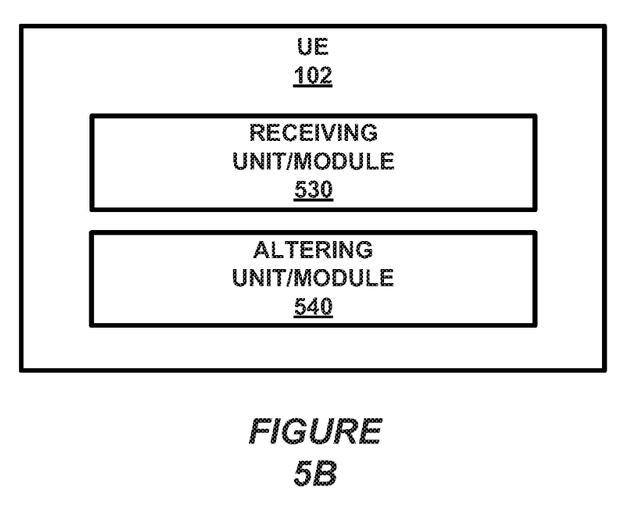

FIG. 5A illustrates additional details of an example UE 102 of a wireless communication system 100 according to one or more embodiments. The UE 102 is configured, e.g., via functional means or units (which also may be referred to as modules or components herein), to implement processing to perform certain aspects described above in reference to at least the aspects of FIGS. 1 and 2B. As shown in FIG. 5B, the UE 102 in some embodiments for example includes means, modules, components, or units 530 and/or 540 (among other possible means, modules, components, or units not shown explicitly in FIG. 5B) for performing aspects of the techniques described above. In some examples, these means, modules, components, or units can be realized in processing circuitry 500. Specifically, the functional means or units of the UE 102 may include a receiving unit/module 530 configured to receive a message indicating an altered logical channel prioritization order from a network node 106, such as in block 212 of method 210 outlined in reference to FIG. 2B. In addition, the UE 102 can include an altering unit/module 540 configured to alter an LCP order utilized by the UE 102 to the altered LCP order indicated by the message, for example, as performed in block 214 of FIG. 2B, as described above.

In at least some embodiments, the UE 102 comprises one or more processing circuitry/circuits 500 configured to implement processing of the method 210 presented in FIG. 2B and certain associated processing of the features described in relation to FIG. 2B and other figures, such as by implementing functional means or units above. In one embodiment, for example, the processing circuit(s) 500 implements functional means or units as respective circuits. The circuits in this regard may comprise circuits dedicated to performing certain functional processing and/or one or more microprocessors in conjunction with memory 520. In embodiments that employ memory 520, which may comprise one or several types of memory such as read-only memory (ROM), random-access memory, cache memory, flash memory devices, optical storage devices, etc., the memory 520 stores program code that, when executed by the one or more microprocessors, carries out the techniques described herein.

In one or more embodiments, the UE 102 also comprises communication circuitry 510. The communication circuitry 510 includes various components (e.g., antennas) for sending and receiving data and control signals. More particularly, the circuitry 510 includes a transmitter that is configured to use known signal processing techniques, typically according to one or more standards, and is configured to condition a signal for transmission (e.g., over the air via one or more antennas). Similarly, the communication circuitry includes a receiver that is configured to convert signals received (e.g., via the antenna(s)) into digital samples for processing by the one or more processing circuits. In some embodiments, communication circuitry 510 includes receiving unit/module 540.

In an aspect, the UE 102 may correspond to any mobile (or even stationary) device that is configured to receive/consume user data from a network-side infrastructure, including laptops, phones, tablets, IoT devices, etc. Thus, UE 102 is any type of device capable of communicating with a network node 106 over radio signals, such as, but not limited to, a device capable of performing autonomous wireless communication with one or more other devices, including a machine-to-machine (M2M) device, a machine-type communications (MTC) device, a user equipment (UE) (however it should be noted that the UE does not necessarily have a "user" in the sense of an individual person owning and/or operating the device). An UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

Those skilled in the art will also appreciate that embodiments herein further include corresponding computer programs. A computer program comprises instructions which, when executed on at least one processor of the network node 106 or UE 102, cause these devices to carry out any of the respective processing described above. Furthermore, the processing or functionality of network node 106 or UE 102 may be considered as being performed by a single instance or device or may be divided across a plurality of instances of network node 106 or UE 102 that may be present in a given system such that together the device instances perform all disclosed functionality, Embodiments further include a carrier containing such a computer program. This carrier may comprise one of an electronic signal, optical signal, radio signal, or computer readable storage medium, A computer program in this regard may comprise one or more code modules corresponding to the means or units described above.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a network node in a wireless communication system, the method comprising:

receiving a request message to alter a logical channel prioritization (LCP) order from a user equipment (UE);
determining to alter the LCP order utilized by the UE to an altered LCP order, wherein the determining to alter the LCP order is responsive to the network node receiving the request message; and
indicating the altered LCP order to the UE.

2. The method of claim 1, wherein indicating the altered LCP order to the UE comprises indicating one or more differences between the LCP order and the altered LCP order.

3. The method of claim 1, wherein indicating the altered LCP order to the UE comprises indicating channel priorities for each logical channel and/or medium access control element available to the UE for uplink transmission.

4. The method of claim 1, wherein indicating the altered LCP order to the UE comprises transmitting dedicated Radio Resource Configuration (RRC) signaling indicating the altered LCP order to the UE.

5. The method of claim 4, wherein the dedicated RRC signaling comprises an RRC connection reconfiguration message.

6. The method of claim 4, wherein indicating the altered LCP order to the UE comprises indicating the altered LCP order specifically to the UE via a Medium Access Control (MAC) Control Element (CE).

7. The method of claim 4, wherein indicating the altered LCP order to the UE comprises indicating the altered LCP order via a System Information Block (SIB) message to all connected UEs in a cell and all idle or inactive UEs that are camping in the cell.

8. The method of claim 4, wherein indicating the altered LCP order to the UE comprises transmitting relative priorities of two or more available logical channels or logical channel groups.

9. The method of claim 4, wherein indicating the altered LCP order to the UE comprises transmitting relative priorities for two or more available logical channels via a logical channel list that contains the two or more available logical channels in a corresponding order of priority.

10. The method of claim 1, wherein indicating the altered LCP order to the UE comprises transmitting the altered LCP order via Layer 1 or Layer 2 signaling.

11. The method of claim 1, wherein determining to alter the LCP order is further responsive to a determination that certain traffic fails to meet one or more Quality of Service (QoS) requirements.

12. The method of claim 1, wherein determining to alter the LCP order is further responsive to a determination that certain traffic fails to meet one or more latency requirements.

13. The method of claim 1, wherein determining to alter the LCP order is further responsive to a determination that a system load meets a system load criterion for altering the LCP order.

14. The method of claim 1, wherein determining to alter the LCP order is further responsive to the network node receiving an indication from the UE that the UE has an amount of data available for transmission that meets a data amount criterion.

15. The method of claim 1, wherein the receiving the request message comprises receiving the request message via RRC signaling.

16. The method of claim 15, wherein the RRC signaling comprises a UEAssistanceInformation message that comprises information regarding a state of the UE.

17. The method of claim 15, wherein the RRC signaling comprises a MAC-DynamicPrioConfig Information Element (IE) that indicates a requested relative priority of each available MAC CE and logical channel.

18. The method of claim 1, wherein the altered LCP order prioritizes one or more data transmissions over channel signaling.

19. The method of claim 1, wherein the LCP order is a default priority list utilized by the one or more UEs absent any altered LCP order being indicated by the network node.

20. The method of claim 1, wherein the altered LCP order is cell-specific and/or UE-specific.

21. A method performed by a user equipment (UE) in a wireless communication system, the method comprising:
    generating a request to alter a logical channel prioritization (LCP) order;
    transmitting the request to alter the LCP order to a network node;
    receiving, responsive to transmitting the request, a message indicating an altered LCP order from the network node; and
    altering the LCP order utilized by the UE to the altered LCP order indicated by the message.

22. The method of claim 21, wherein the received message indicates one or more differences between the LCP order and the altered LCP order.

23. The method of claim 21, wherein the received message indicates relative channel priorities for each logical channel and/or medium access control element available to the UE for uplink transmission.

24. The method of claim 21, wherein receiving the message comprises receiving dedicated Radio Resource Configuration (RRC) signaling indicating the altered LCP order to the UE.

25. The method of claim 24, wherein the dedicated RRC signaling comprises an RRC connection reconfiguration message.

26. The method of claim 24, wherein the received message is addressed to the UE specifically and is received at the UE via a Medium Access Control (MAC) Control Element (CE).

27. The method of claim 24, wherein the received message indicates the altered LCP order via a System Information Block (SIB) message to all connected UEs in a cell and all idle or inactive UEs that are camping in the cell.

28. The method of claim 21, wherein the received message comprising the altered LCP order is received at the UE via Layer 1 or Layer 2 signaling.

29. The method of claim 21, wherein the altered LCP order comprises relative priorities of two or more available logical channels or logical channel groups.

30. The method of claim 21, wherein the altered LCP order comprises relative priorities for two or more available logical channels via a logical channel list that contains the two or more available logical channels in a corresponding order of priority.

31. The method of claim 21, wherein the generated request indicates that UE has an amount of data available for transmission that meets a data amount criterion for altering the LCP order.

32. The method of claim 31, wherein the request message contains a field indicating the relative priority of two or more available logical channels or logical channel groups.

33. The method of claim 31, wherein the request message indicates relative priorities for two or more available logical channels via a logical channel list that contains the two or more available logical channels in a corresponding requested order of priority.

34. The method of claim 21, wherein the transmitting the request comprises transmitting the request message via RRC signaling.

35. The method of claim 34, wherein the RRC signaling comprises a UEAssistanceInformation message that comprises information regarding a state of the UE.

36. The method of claim 34, wherein the RRC signaling comprises a MAC-DynamicPrioConfig Information Element (IE) that indicates a requested relative priority of each available MAC CE and logical channel.

37. The method of claim 21, wherein the request message is transmitted via Layer 1 or Layer 2 signaling.

38. The method of claim 21, wherein the altered LCP order prioritizes one or more data transmissions over channel signaling.

39. The method of claim 21, further comprising transmitting one or more wireless communications from the UE to the network node according to the altered LCP order.

40. The method of claim 21, wherein the LCP order is a default priority list utilized by the one or more UEs absent any altered LCP order being indicated by the network node.

41. The method of claim 21, wherein the altered LCP order is cell-specific and/or UE-specific.

42. A network node in a wireless communication system, the network node comprising a memory and one or more processors, the memory storing processor-executable instructions that, when executed by the one or more processors, cause the network node to:
    receive a request message to alter a logical channel prioritization (LCP) order from a user equipment (UE);
    determine to alter the LCP order utilized by the UE to an altered LCP order, wherein the determination to alter the LCP order is responsive to the network node receiving the request message; and
    indicate the altered LCP order to the UE.

43. A user equipment (UE) in a wireless communication system, the UE comprising a memory and one or more processors, the memory storing processor-executable instructions that, when executed by the one or more processors, cause the UE to:
    generate a request to alter a logical channel prioritization (LCP) order;
    transmit the request to alter the LCP order to a network node;
    receive a message indicating an altered LCP order from the network node; and
    alter the LCP order utilized by the UE to the altered LCP order indicated by the message.

* * * * *